(12) United States Patent
Konya

(10) Patent No.: US 8,022,978 B2
(45) Date of Patent: Sep. 20, 2011

(54) AUTOTILLER CONTROL SYSTEM FOR AIRCRAFT UTILIZING CAMERA SENSING

(75) Inventor: Kazuhide Konya, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 1249 days.

(21) Appl. No.: 11/432,837

(22) Filed: May 11, 2006

(65) Prior Publication Data

US 2010/0241291 A1    Sep. 23, 2010

Related U.S. Application Data

(62) Division of application No. 10/251,570, filed on Sep. 20, 2002, now Pat. No. 7,113,202.

(51) Int. Cl.
*H04N 7/14* (2006.01)
(52) U.S. Cl. .......... 348/17; 348/117; 348/119; 348/113; 348/114; 348/116; 348/140; 348/141; 701/120; 701/121; 701/213; 701/214; 701/215

(58) Field of Classification Search ............... 348/117, 348/119, 113, 114, 116, 140, 141, 17; 701/213, 701/214, 215, 120, 121
See application file for complete search history.

(56) References Cited

U.S. PATENT DOCUMENTS

| 5,774,818 | A | | 6/1998 | Pages | |
|---|---|---|---|---|---|
| 6,018,698 | A | * | 1/2000 | Nicosia et al. | 701/214 |
| 6,100,964 | A | * | 8/2000 | De Cremiers | 356/4.01 |
| 6,246,320 | B1 | * | 6/2001 | Monroe | 340/506 |
| 6,411,890 | B1 | * | 6/2002 | Zimmerman | 701/120 |
| 6,539,303 | B2 | * | 3/2003 | McClure et al. | 701/213 |
| 6,862,519 | B2 | * | 3/2005 | Walter | 701/120 |
| 6,928,363 | B2 | * | 8/2005 | Sankrithi | 701/120 |
| 7,113,202 | B2 | * | 9/2006 | Konya | 348/117 |

* cited by examiner

*Primary Examiner* — Shawn An
(74) *Attorney, Agent, or Firm* — Toler Law Group

(57) ABSTRACT

An automatic control system for directional control of an aircraft moving on the ground utilizing computer vision methods and camera sensing methods (visible, infrared or microwave) to optically recognize and track taxiway navigation features thereby providing pilot television picture steering cues or force inputs to the nosewheel steering system to maintain the aircraft on the centerline.

20 Claims, 4 Drawing Sheets

AUTOTILLER CONTROL SYSTEM FOR AIRCRAFT UTILIZING CAMERA SENSING

This application is a Divisional Patent Application of, and claims priority from, U.S. patent application Ser. No. 10/251,570 filed on Sep. 20, 2002, now issued as U.S. Pat. No. 7,113,202 and entitled "AUTOTILLER CONTROL SYSTEM FOR AIRCRAFT UTILIZING CAMERA SENSING", which is hereby incorporated by reference in its entirety.

FIELD OF THE INVENTION

This invention pertains to automatic guidance and control systems for aircraft moving on the ground, and more particularly, to an autotiller control system for aircraft utilizing camera sensing.

BACKGROUND OF THE INVENTION

Deregulation of the airline industry has resulted in reduced airfares, which when combined with stable fuel prices that has produced a volume of air travel that has been strongly and steadily increasing in the past decade, and this trend is expected to continue unabated over the next two decades. Airport support infrastructure, however, has not kept pace with increasing traffic volume, and is expected to lag further in the coming decades. With limited numbers of airport gates, there is a strong motivation for airlines to move to larger aircraft to accommodate increased passenger volume through a limited number of gates. The need for larger aircraft is particularly critical at major "hub" airports in the "hub and spoke" systems operated by most large airlines in order to maximize passenger flow through their limited airport facilities.

A significant problem with larger aircraft is that it may be difficult to physically accommodate the increased wingspan in airport gates and taxiways designed for smaller aircraft. Increased wingspan for the larger aircraft is also highly desirable in view of the substantially improved aerodynamic efficiency and payload-range characteristics that are associated with increased wingspan. The increased wingspan and/or length of larger aircraft will make parking such aircraft next to each other at gates more risky in terms of probability of collision, and will also increase problems related to ground service vehicle, arrangements, flows, and congestion. Similarly, the increased wingspan increases the probability of collisions between aircraft taxiing on taxiways/taxilanes or other fixed objects, Several prior art approaches exist, which address the problems associated with fitting larger aircraft into airport facilities originally designed for smaller aircraft. One obvious approach to maximizing passenger volume capability at a limited number of airport gates has been to park the largest possible aircraft type that will "fit" at each gate, given the constraining requirements of minimum clearances between the parked aircraft's wingtips and the wingtips of adjacent parked or parking aircraft and between the parked aircraft's aftmost extremity (e.g., tip of tail) and the "parking limit line" which separates the parking area from an adjacent active taxilane. This is a reasonable approach, but is inherently limited in the amount of additional passenger volume it can develop. Airline fleet mix, and more particularly the fleet mix present at each hub complex (i.e., the mix of aircraft actually present simultaneously at a gate constrained hub airport), can reduce the effectiveness of this strategy in increasing passenger volume. Airport terminals with movable (i.e., apron-drive type) passenger boarding bridges can take advantage of this method to a considerably greater extent than can airport terminals with fixed boarding bridges, because movable bridges can be moved to effectively change the maximum aircraft size accommodatable at each gate.

A second prior art approach has been to reduce the allowable operational clearances between parked aircraft and between a given aircraft and other fixed or moving objects (including other aircraft). An FAA Advisory Circular 150/5300-13 CHG 6, Sep. 30, 2000 specifies minimum clearances to be assumed for airport facilities design and expansion purposes. The specified clearance between a taxiing aircraft's wingtip and a nearest fixed-or-movable object is 44 ft. for Group IV airplanes (e.g., 767 or DC-10 class). Current airline practice includes examples of wingtip-to-wingtip clearances of as low as 17 ft. between adjacent parked aircraft or between two aircraft on parallel taxiways. An obvious disadvantage of this second approach is that it increases the probability of collisions, and requires increased pilot attention and precision for the taxiing and parking tasks.

A third prior art approach is to alternate large and small aircraft (747's and 737's) at gates nominally designed for 767/DC-10 size aircraft. While this approach increases the size of the largest accommodatable aircraft, it has the disadvantage that it may not significantly increase total passenger volume accommodatable, for example total passengers for 5 747's and 5 737's may not be significantly greater than for 10 DC-10's.

A fourth prior art approach goes beyond reducing allowable clearances between aircraft or alternating large and small aircraft. By taking into account the vertical separation between wingtips. For example, a DC-10 could be parked adjacent to a 727 with zero or even negative wingtip separation in a plan view, but with no real wing interference if the 727 wingtip passes under the DC-10 outer wing. Adequate vertical clearances have to be established accounting for the lowest possible ground clearance for the DC-10 wing and the highest possible wingtip location for the 727 (e.g., due to weight, gusts, etc.). The disadvantages of this approach are that it requires that airplanes with adequate vertical clearances be alternately parked, it limits gate assignment flexibility, and (ii) it aggravates problems of ground service vehicle access and parking.

A fifth prior art approach has been to use angled parking of aircraft at the gate combined with carefully designed nonlinear (e.g., curved) taxi-in paths to enable larger aircraft to park at gates designed for smaller aircraft, with the same level of wingtip-to-nearest-fixed-or-moving-object separations, While this approach is judged to be a viable for increasing the maximum aircraft size accommodatable and total passenger volume accommodatable at space constrained airport gates, the amount of increased airplane wingspan is limited to about 5 to 10%. Another possible disadvantage is that, for significant parking angles, modifications may need to be made to certain boarding bridges (e.g., fixed pedestal bridges) to increase the yaw swivel capability of the boarding bridgehead to assure proper sealed mating of the bridge head with the aircraft door. Or, alternatively replace the fixed pedestal bridge with an apron-drive-bridge that can swing laterally and has telescoping capability.

Yet another approach to increasing aircraft size accommodatable between adjacent parallel airport terminal piers is to replace dual, bidirectional wide-body aircraft taxilanes with unequal width dual taxilanes that re bidirectional for narrow-body aircraft (e.g., 737's and 757's) but are only unidirectional (i.e., effectively single lane) for increased span wide-body aircraft. However, this limitation could aggravate ground traffic congestion delays at major hub airports.

Finally, a seventh prior art approach to increasing aircraft size accommodatable in constrained gates and taxilanes is to equip the aircraft with foldable wingtips. This approach provides very significant airport compatibility benefits with correspondingly significant weight, complexity, and cost penalties.

As will be apparent, variations and combinations of the above-mentioned approaches are also possible.

All of the approaches cited above, except for approaches second and seventh, have the disadvantage of not allowing for increased airplane wingspan for dual bidirectional taxilanes between parallel terminal piers.

SUMMARY OF THE INVENTION

This invention enables increased size (e.g., span and length) airplanes to operate in space constrained airport gates and taxilanes, without the disadvantages associated with prior art approaches, through use of an "autotiller" concept. The autotiller concept can also be used in conjunction with the prior art approaches 1 through 8 discussed in the Background of the Invention section above, to yield potential additional airport compatibility advantages. The invention is intended to enable increased span configurations to be compatible with airport gate and taxiway taxilane facilities sized for smaller size and span aircraft. The "autotiller provides a method of automatically and precisely controlling nosewheel steering so as to keep the nosewheel very close to (e.g., within about ±2' of) the desired nosewheel taxiline as the aircraft taxis through "tight" taxilanes and in and possibly out of its parking position. Precise means for sensing or computing nosewheel lateral deviation from the nosewheel taxiline are key to implementing the autotiller system. An example of such means uses a video tracking system that will combine the aircraft onboard camera system used for taxiing with appropriate sensors (such as infra-red), a tracking control system, and the aircraft nose gear steering system. The result is machine recognition and tracking of certain visual patterns of the taxiway path that will allow automatic taxi guidance with little or not pilot input. A long term approach is to automate the turning choice decision at each taxiway intersection based on an on-board airport digital map and GPS-guided tracking to support the autotiller steering control system. Other methods of precisely sensing/computing aircraft position/orientation to support the autotiller function include use of optical or contact sensors, onground sensors such as pneumatic wheel passage sensors, and odometry or inductive wire embedded in pavement. Lateral position sensing/computing can be combined with longitudinal position sensing/computing, and the automatic nosewheel steering can optionally be combined with automatic thrust/braking control for on-ground taxi operations. Means are provided for smooth switching from one taxi path to another (e.g., when turning from one taxilane to another), and emergency automatic collision avoidance steering/braking means may optionally be provided. Autotiller steering will preferably be automatic with parallel tiller operation and pilot override capability. Autotiller system operational/failure status will preferably be annunciated to the flight crew.

In an alternate embodiment of autotiller call "taxi director: ", the autotiller commands do not drive the nosewheel steering directly but instead produce guidance commands which are displayed to the pilot, who executes or follows these commands through operation of tiller steering. The "taxi director" provides a method of precisely guiding the pilot in controlling nosewheel steering so as to keep the nosewheel very close to (e.g., within about ±2') of the desired nosewheel taxiline as the aircraft taxis through "tight" taxilanes and into optionally curved taxi-in paths to its final optionally angled parking position. In a preferred mode of carrying out the invention, the taxi director drives a guidance display visible to the pilot even while the pilot is looking out of his forward windows (i.e., pilot is "head up"). For example, sensed lateral deviation from the desired taxi line can drive a paravisual display (PVD) similar to the optional PVD's used for directional guidance along the runway centerline for low visibility takeoffs. Alternately, directional guidance commands can be displayed to the pilot on a heads-up display (HUD). The pilot can use PVD/HUD guidance information to taxi precisely along the desired taxi lane. By providing tight steering guidance to keep the aircraft on its desired taxi lane centerline with a suitably high repeatability, it should be possible to reduce safely allowable taxiing aircraft wingtip to nearest fixed or movable object clearances.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein.

DETAILED DESCRIPTION OF THE PREFERRED EMBODIMENT

Existing taxiway systems are designed to ICAO (International Civil Aviation Org.), (F.A.A. in the U.S.) standards which call for 10 to 15 meters of wing tip clearance to avoid wing tip contact with another taxiing aircraft or fixed objects. This clearance is a buffer or safety margin to account for pilot error from manual tracking. With the hereinafter described auto taxi tracker system, the wing tip clearance can be significantly reduced, allowing larger span aircraft to operate on the same taxiway.

Figure 1:
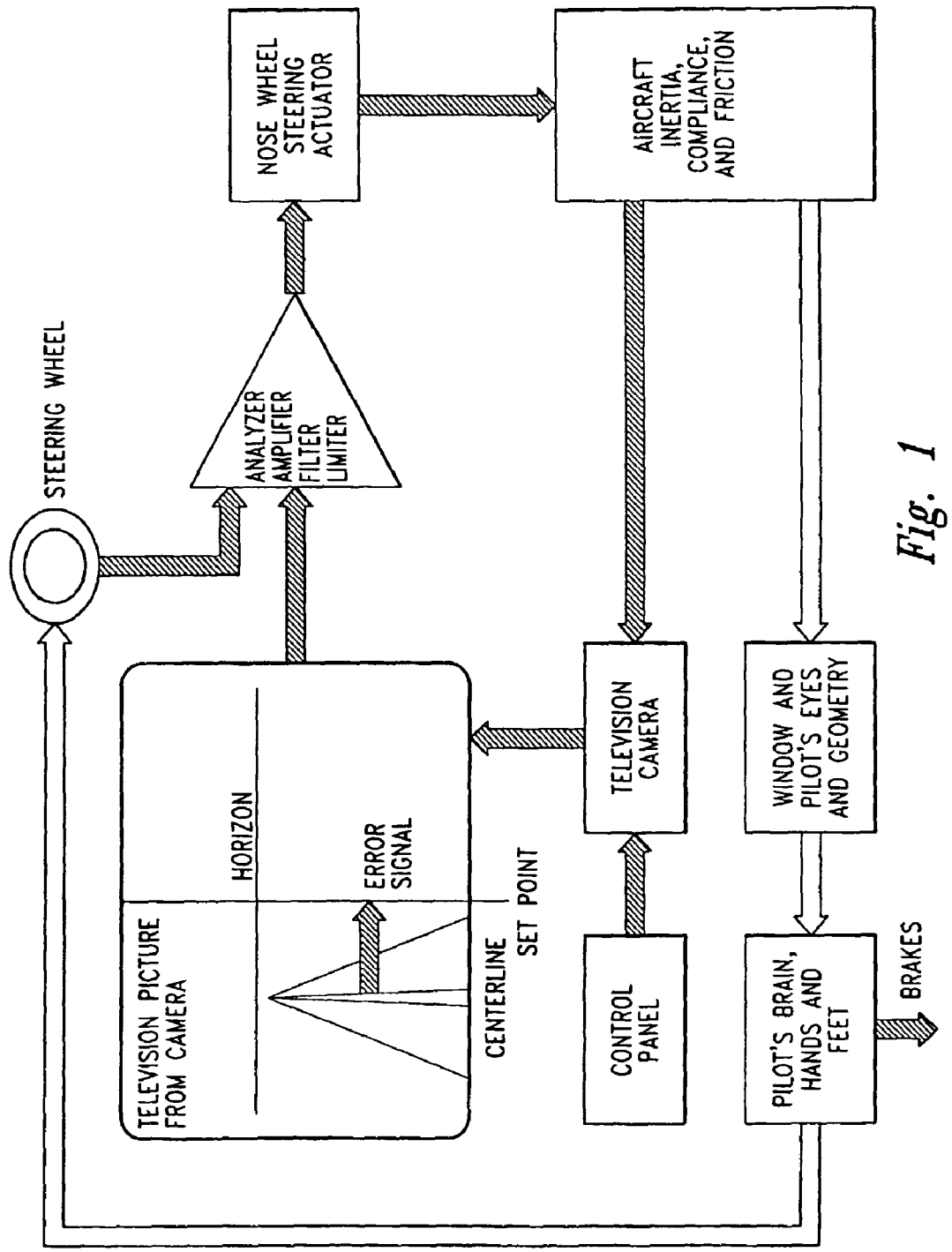
FIG. 1 is a block diagram of an automatic nose wheel steering (NWS) system in accordance with an embodiment of the present auto taxi tracker system.

Applications for the Auto Taxi Tracker System
    Code F aircraft on Code E Airports (E on D, D on C)
    HCST—no forward vision
Cat IIIc (zero visability) capability
Benefits of the Auto Taxi Tracker System
    Reduced pilot workload
    Low visibility taxi capability—use of the infra-red or other signals
    Reduced probability of collision during taxiing
    Reduced minimum taxiway separations: Parallel taxiway separation, taxiway-to-object separation The present video tracking system including infrared light cameras combines the aircraft on-board camera system used for taxiing with sensors, a tracking control system, and the aircraft nose gear steering system as shown in FIG. 1. The result is machine recognition and tracking of certain visual patterns of the taxiway path that will allow automatic taxi guidance with little or no pilot input.

Figure 2:
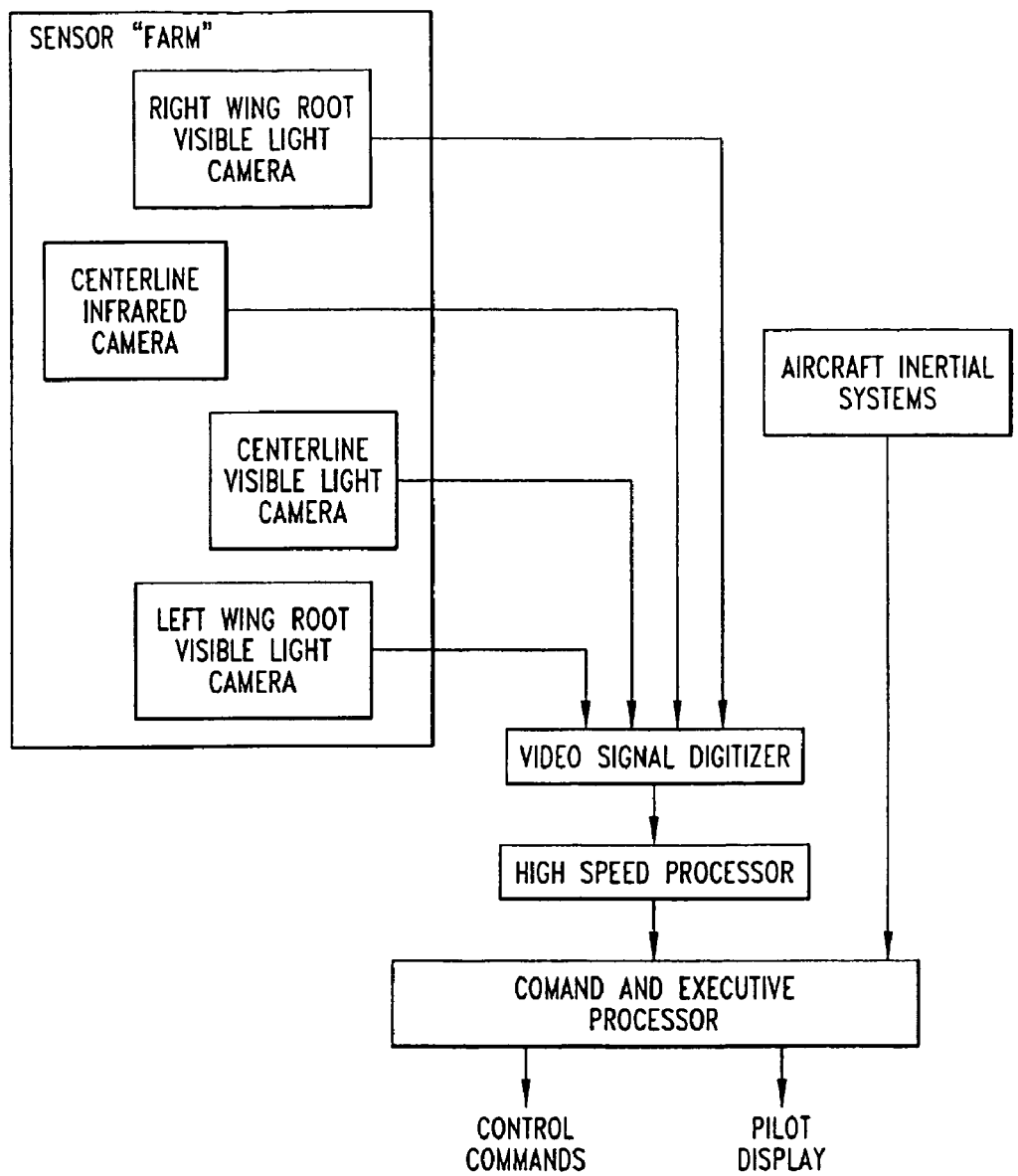
FIG. 2 is a simplified block diagram illustrative of the present system architecture; and, FIG. 3 is a diagram illustrative of the impact of the present taxi tracker system on present airports, wherein the wingtip clearance (z) can be reduced or, alternatively, a greater span aircraft can operate on a given parallel taxiway.

An integrated system of cameras, as shown in FIG. 2, with appropriate sensors (visible, IR, microwave, etc.) and real-time tracker (tracking and guidance) is tied to the aircraft steering system through control commands to provide automatic taxiing capability with little or no pilot input. The target being tracked can be the standard taxiway centerline marking, as shown in FIG. 1, taxiway centerline lights, and/or taxiway edge lights. These ground visual cues already exist at airports today. Even when the lights and the markings are obscured due to snow or glare, the infrared emissions from the centerline lights can be captured. Although the system will work in the dusk and may work in the dark using infrared emissions from the pavement, the aircraft taxi lights will be on to help eliminate shadows, glare and glints. The TX signal may be analyzed, as shown in FIG. 1, to develop a steering signal which will position the nose landing gear wheels such that it puts the aircraft as seen on the camera into a fixed position, probably the center of the picture. The system maybe developed initially to track the aircraft on the centerline of a straight portion of a taxiway system. A goal is to automate the turning choice decision at each taxiway (not shown) intersection based on an on-board airport digital map and GPS-guided locator.

In the processor, shown in FIG. 2, which is comprised of both a high speed signal processing system and a general purpose (executive) computer, feature identification and extraction produces the location within the sensor fields of view of such items as navigation lights and paint striping. Each sensor from the "sensor farm" provides independent information which is subsequently combined mathematically using a model-based Kalman filter or equivalent to derive aircraft position and velocity. In amplified form, this is subtracted from the desired track to produce steering commands. A more sophisticated algorithm might include the aircraft handling characteristics (as shown in FIG. 1).

FIG. 2 illustrates this architecture. It would be noted that ground steering is only a two-dimensional problem if the speed is fixed.

Figure 3:
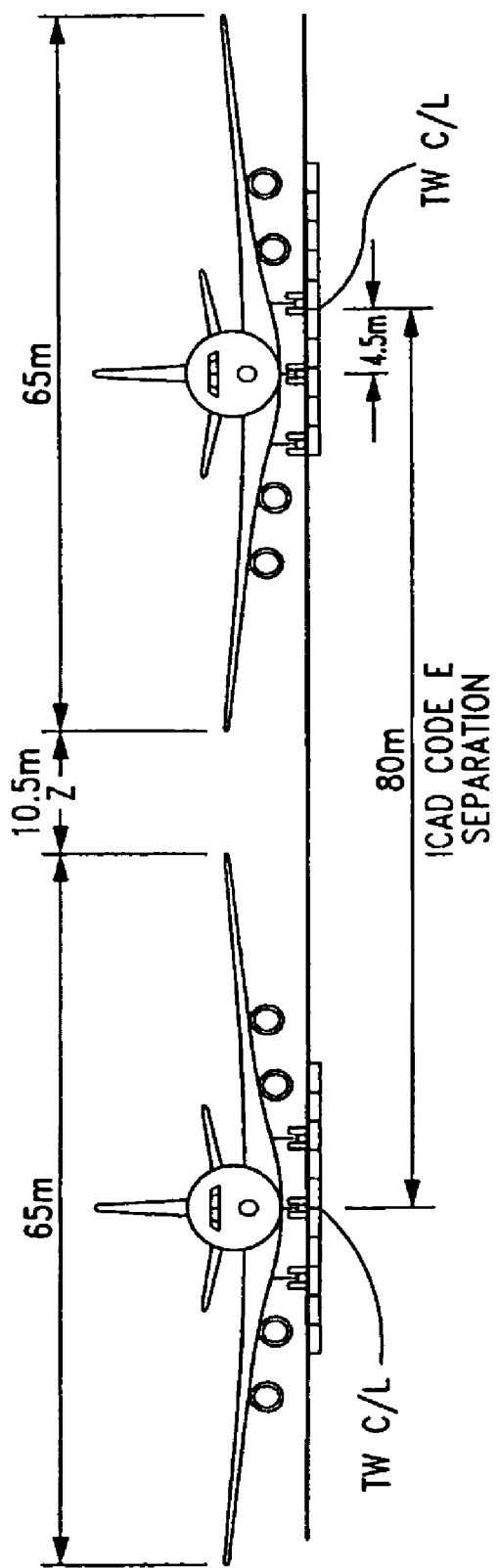

FIG. 3 is a pictorial showing the impact of the present autotaxi tracker system on today's airports where:
ICAO Code E TW separation rationale (Example)
65 m wing span
4.5 m deviation in normal operation
10.5 m safety buffer if aircraft go off the TW
Tracker can safely reduce the 10.5 m buffer in half to allow 70 m span 747 stretch to operate on the same parallel taxiway.

Figure 4:
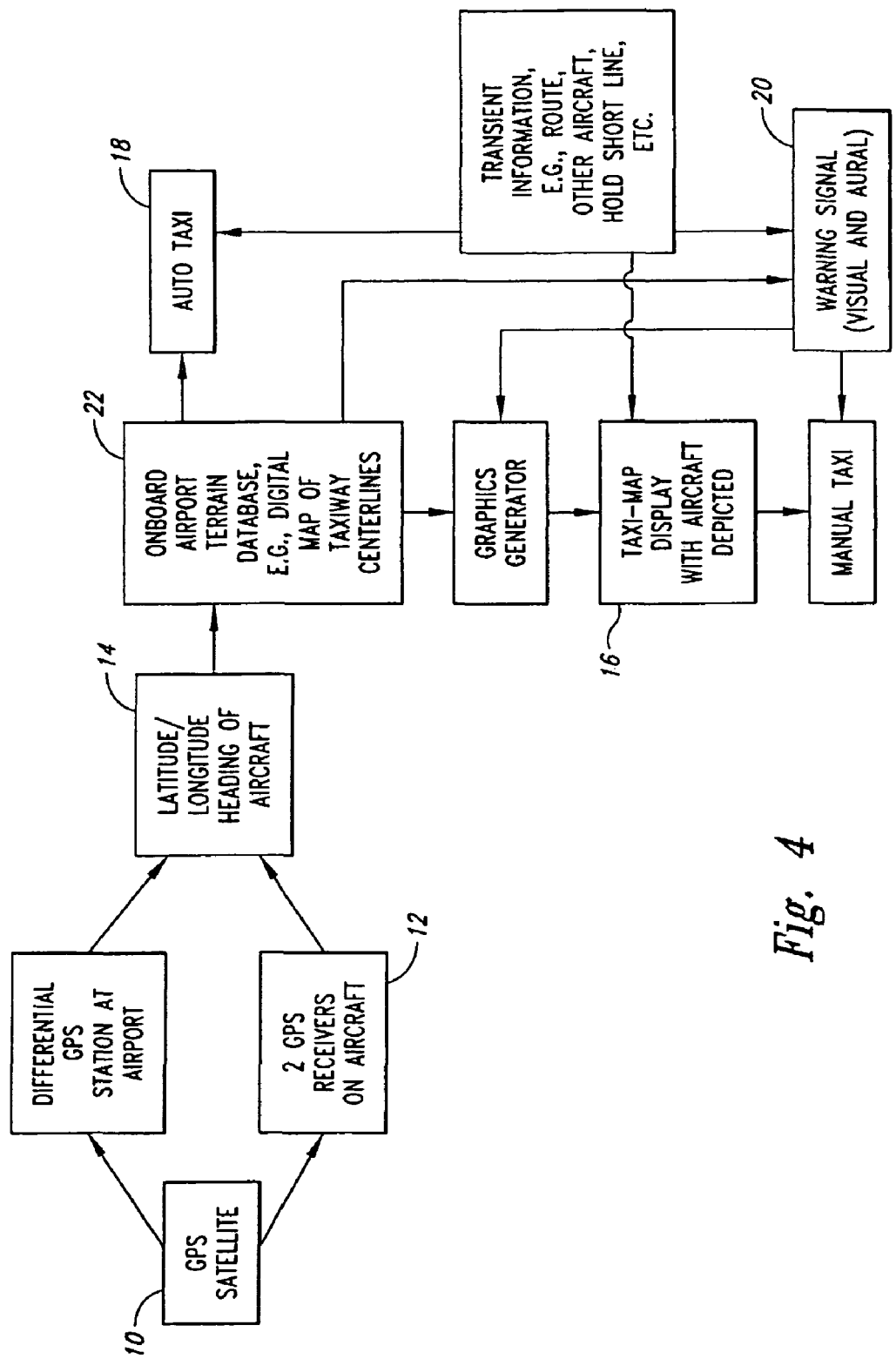
FIG. 4 is a block diagram of a further embodiment of an automatic (autotaxi) control system for aircraft moving on the ground.

Turning now to FIG. 4, there is shown a GPS guided taxi system which relies on GPS satellite 10 to provide the aircraft location on the airfield. Two GPS receivers 12 on the aircraft along the aircraft fuselage centerline provide the directionality of the aircraft. Since the GPS satellite signal does not provide sufficient accuracy for taxiing, the differential GPS station on the airport will be used to correct the error to 0.5 m accuracy. This aircraft locating data 22 is matched against the digitally mapped airfield information, specifically the taxiway centerlines. A cockpit monitor will display the taxi map 16 with aircraft depicted, showing the aircraft to the left/right or on the centerline. The taxi map 16 will have zoom in/out capability and to show taxi routes, other aircraft or obstacles, hold line data, etc. This information, along with the aircraft deviation (from centerline) data and aircraft inertial data will be processed to provide auto taxi capability 18, or alternatively, provide a warning signal 20, visual and/or aural, to the pilot for manual course correction during taxiing.

While certain preferred embodiments have been described in detail above, it should be understood that further modifications and variations can be made within the spirit and scope of the invention as defined in the appended claims.

What is claimed is:

1. An automatic control system for an aircraft moving on the ground, the automatic control system comprising:
 a steering control system,
 said steering control system including:
 digitally mapped airfield information identifying taxiway centerlines of an airfield;
 a global positioning system (GPS) guided tracking system, the GPS guided tracking system including at least two GPS receivers positioned on the aircraft to provide position and directionality information for the aircraft based on one or more GPS signals for comparison to the digitally mapped airfield information; and
 wherein the steering control system provides a signal to indicate a correct course of the aircraft during taxiing to cause the aircraft to taxi along the taxiway centerlines presented by the digitally mapped airfield information.

2. The automatic control system of claim 1, wherein the GPS guided tracking system is configured to communicate with a GPS differential station associated with the airfield to be accurate to within about 0.5 m.

3. The automatic control system of claim 2, wherein the GPS guided tracking system determines the position and directionality information based on at least one signal from a GPS satellite and a differential GPS signal from the GPS differential station associated with the airfield.

4. The automatic control system of claim 1, wherein the steering control system automatically steers a nose wheel of the aircraft.

5. The automatic control system of claim 1, wherein the at least two GPS receivers are arranged approximately along a centerline of the aircraft, wherein the position and directionality information determined from one or more GPS signals is compared with the taxiway centerlines to correct course of the aircraft during taxiing to cause the aircraft to taxi along the taxiway centerlines.

6. The automatic control system of claim 1, wherein the steering control system provides a warning signal based on deviation of the aircraft from one or more of the taxiway centerlines to enable a manual course correction.

7. The automatic control system of claim 6, wherein the warning signal is visual.

8. The automatic control system of claim 6, wherein the warning signal is aural.

9. The automatic control system of claim 6, wherein the warning signal is visual and aural.

10. The automatic control system of claim 1, wherein the GPS guided tracking system includes a computing system.

11. The automatic control system of claim 1, wherein the steering control system is configured to automatically adjust a course of the aircraft to cause the aircraft to taxi along the taxiway centerlines.

12. An automatic control system for an aircraft moving on the ground, the automatic control system comprising:
 a steering control system, the steering control system including:
 digitally mapped airfield information identifying taxiway centerlines of an airfield; and
 a global positioning system (GPS) guided tracking system, the GPS guided tracking system including at least two GPS receivers positioned along a centerline of the aircraft to generate an aircraft centerline indicating both position and directionality information for the aircraft based on one or more GPS signals, wherein the steering control system provides a signal to indicate a correct course of the aircraft during taxiing by comparing the aircraft centerline to the taxiway centerlines presented by the digitally mapped airfield information.

13. The automatic control system of claim 12, wherein the GPS guided tracking system is configured to communicate with a GPS differential station associated with the airfield to be accurate to within about 0.5 meters.

14. The automatic control system of claim 13, wherein the aircraft location and directionality information is determined based on at least one signal from a GPS satellite and a differential GPS signal from the differential GPS station at the airfield.

15. The automatic control system of claim 12, wherein the steering control system provides a warning signal based on deviation of the aircraft from one or more of the taxiway centerlines to enable a manual course correction.

16. The automatic control system of claim 12, wherein the GPS guided tracking system includes a computing system.

17. The automatic control system of claim 12, wherein the steering control system is configured to automatically adjust a course of the aircraft to cause the aircraft to taxi so that the aircraft centerline travels along the taxiway centerlines.

18. A method of providing course information for an aircraft moving on the ground, the method comprising:

accessing digitally mapped airfield information including taxiway centerlines of an airfield;

receiving a first position signal from a first global positioning system (GPS) receiver positioned at a first position in the aircraft;

receiving a second position signal from a second GPS receiver positioned at a second position in the aircraft;

determining an aircraft position and an aircraft directionality from the first position signal and the second position signal;

comparing the aircraft position and the aircraft directionality with the taxiway centerlines of the airfield; and generating a signal indicating a steering change to conform the aircraft position and the aircraft directionality to the taxiway centerlines, wherein the signal includes:

a warning signal when the aircraft is being manually steered; and a steering signal when the aircraft is being automatically steered by an automatic control system.

19. The method of claim 18, wherein the first GPS receiver and the second GPS receiver receive a differential signal received from a GPS differential station associated with the airfield to be accurate to within about 0.5 meters.

20. The method of claim 18, wherein the warning signal includes at least one of a visual signal and an aural signal.

* * * * *